(12) United States Patent
Kuroda

(10) Patent No.: US 11,585,372 B2
(45) Date of Patent: Feb. 21, 2023

(54) BALL JOINT, STABILIZER LINK USING BALL JOINT, AND STABILIZER ASSEMBLY

(71) Applicant: NHK SPRING CO., LTD., Kanagawa (JP)

(72) Inventor: Shigeru Kuroda, Yokohama (JP)

(73) Assignee: NHK SPRING CO., LTD., Kanagawa (JP)

( * ) Notice: Subject to any disclaimer, the term of this patent is extended or adjusted under 35 U.S.C. 154(b) by 372 days.

(21) Appl. No.: 16/497,657

(22) PCT Filed: Mar. 23, 2018

(86) PCT No.: PCT/JP2018/011813
§ 371 (c)(1),
(2) Date: Sep. 25, 2019

(87) PCT Pub. No.: WO2018/181035
PCT Pub. Date: Oct. 4, 2018

(65) Prior Publication Data
US 2021/0101431 A1   Apr. 8, 2021

(30) Foreign Application Priority Data

Mar. 29, 2017   (JP) .............................. JP2017-064808

(51) Int. Cl.
*B60G 7/00*   (2006.01)
*F16C 11/06*   (2006.01)

(52) U.S. Cl.
CPC .......... *F16C 11/0633* (2013.01); *B60G 7/005* (2013.01); *B60G 2204/416* (2013.01); *F16C 2326/05* (2013.01); *Y10T 403/32737* (2015.01)

(58) Field of Classification Search
CPC .............. F16C 11/0619; F16C 11/0623; F16C 11/0628; F16C 11/0633; F16C 11/0638;
(Continued)

(56) References Cited

U.S. PATENT DOCUMENTS 5,609,433 A * 3/1997 Pazdirek ............. F16C 11/0657
264/273
5,782,573 A * 7/1998 Dorr ..................... F16C 11/069
403/135
(Continued)

FOREIGN PATENT DOCUMENTS

CN    102149930    8/2011
CN    201982480    9/2011
(Continued)

OTHER PUBLICATIONS

Translated Application of KR 20110015816 A1. Kwon, Tae Sung. Control Arm of Vehicle. Feb. 17, 2011.*
(Continued)

*Primary Examiner* — Josh Skroupa
*Assistant Examiner* — Kevin J Baynes
(74) *Attorney, Agent, or Firm* — Greenblum & Bernstein, P.L.C.

(57) ABSTRACT

The ball joint includes a metal ball stud which includes a ball section and a resin housing which rotatably supports the ball section of the ball stud. A limiting member configured to limit molding shrinkage of the housing is embedded in the housing at an interval with respect to an equatorial section of the ball section such that the limiting member is positioned to surround at least the equatorial section of the ball section.

7 Claims, 9 Drawing Sheets

(58) Field of Classification Search
CPC .............. F16C 11/0695; F16C 2326/05; Y10T 403/32737; Y10T 403/32771; Y10T 403/32786; B60G 7/005; B60G 2204/416; B60G 21/0551

See application file for complete search history.

(56) References Cited

U.S. PATENT DOCUMENTS

| | | | | |
|---|---|---|---|---|
| 6,109,816 | A * | 8/2000 | Iwasaki | B60G 7/005 403/122 |
| 8,281,490 | B2 * | 10/2012 | Nishide | F16C 23/043 29/898.049 |
| 8,376,647 | B2 * | 2/2013 | Kuroda | F16C 7/02 403/134 |
| 9,476,447 | B2 * | 10/2016 | Schmidt | F16C 11/0685 |
| 2003/0152420 | A1 | 8/2003 | Broker | |
| 2005/0105961 | A1 * | 5/2005 | Kondoh | F16C 11/0633 403/122 |
| 2008/0193208 | A1 * | 8/2008 | Nordloh | F16C 11/0685 403/135 |
| 2009/0080967 | A1 * | 3/2009 | Gercke | F16C 33/28 403/135 |
| 2011/0133422 | A1 * | 6/2011 | Jeong | F16C 11/0638 280/124.1 |
| 2012/0141192 | A1 * | 6/2012 | Kwon | F16C 11/0657 403/135 |

FOREIGN PATENT DOCUMENTS

| | | | |
|---|---|---|---|
| CN | 202768622 | 3/2013 | |
| CN | 103707735 | 4/2014 | |
| CN | 105221561 | 1/2016 | |
| CN | 205663747 | 10/2016 | |
| DE | 1 035 495 B | 7/1958 | |
| DE | 101 25 227 | 12/2002 | |
| DE | 102009004517 A1 * | 7/2010 | .......... F16C 11/0633 |
| DE | 10 2012 202 987 A1 | 8/2013 | |
| EP | 1 953 012 A2 | 8/2008 | |
| EP | 2 465 713 A1 | 6/2012 | |
| EP | 2 601 061 | 6/2013 | |
| EP | 2 642 141 | 9/2013 | |
| JP | 2-117468 U | 9/1990 | |
| JP | 11-13740 A | 1/1999 | |
| JP | 2002-31124 A | 1/2002 | |
| JP | 2009-501885 A | 1/2009 | |
| JP | 2011-116339 A | 6/2011 | |
| JP | 2015-152153 A | 8/2015 | |
| JP | 2016-75333 A | 5/2016 | |
| KR | 10-2010-0109708 A | 10/2010 | |
| KR | 20110015816 A * | 2/2011 | .......... F16C 11/0633 |
| KR | 20110063164 | 6/2011 | |
| KR | 101632656 | 6/2016 | |
| WO | WO-9013754 A1 * | 11/1990 | .......... F16C 11/0609 |
| WO | 97/05398 A1 | 2/1997 | |
| WO | WO-2005003575 A1 * | 1/2005 | .......... F16C 11/0638 |
| WO | WO-2006120787 A1 * | 11/2006 | .......... F16C 11/0638 |
| WO | 2012/017143 | 2/2012 | |
| WO | 2016/175417 A1 | 11/2016 | |

OTHER PUBLICATIONS

Chinese Official Action received in CN Application No. 201880019807.6, dated Feb. 2, 2021 and partial English language translation of search report.

Supplementary European Search Report issued in EP Application No. 18774175.6, dated Dec. 10, 2020.

Notice of Allowance issued in CN 201880019807.6, dated Aug. 11, 2021 and English language translation.

International Search Report issued in International Bureau of WIPO Patent Application No. PCT/JP2018/011813, dated Jun. 12, 2018.

* cited by examiner

BALL JOINT, STABILIZER LINK USING BALL JOINT, AND STABILIZER ASSEMBLY

TECHNICAL FIELD

The present invention relates to a ball joint, a stabilizer link using the ball joint, and a stabilizer with the stabilizer link.

Priority is claimed on Japanese Patent Application No. 2017-64808, filed Mar. 29, 2017, the content of which is incorporated herein by reference.

BACKGROUND

A vehicle includes a suspension device which absorbs and reduces shock and vibration transmitted from a road surface to a vehicle body through the wheels thereof and a stabilizer configured to enhance the roll rigidity of the vehicle body. In order to smoothly join a suspension device to a stabilizer, a rod-shaped joining member called a stabilizer link is used for a vehicle. For example, as described in Patent Document 1, a stabilizer link includes a support bar and ball joints provided at both end portions of the support bar.

The ball joint associated with Patent Document 1 is constituted of metal ball studs having ball sections, and resin housings provided at both ends of a support bar and each of the housings is configured to rotatably accommodate the ball section associated with the ball stud. A resin ball seat is provided in a portion of each of the housings on an inner side thereof such that the ball seat is disposed between an inner wall of the housing and the ball section associated with the ball stud. An outer peripheral surface of the ball section accommodated in the housing slides while in contact with an inner peripheral surface of the ball seat. Thus, the ball stud can be tilted freely. In this way, the suspension device is smoothly joined to the stabilizer through the ball joint included in the stabilizer link.

According to the ball joint associated with Patent Document 1, it is possible to appropriately manage a torque associated with the sliding of the ball section with respect to the housing.

DOCUMENT OF RELATED ART

Patent Document

[Patent Document 1] Japanese Unexamined Patent Application, First Publication No. 2015-452153

SUMMARY

Technical Problem

In the ball joint of the stabilizer link described in Patent Document 1, after the ball seat has been installed in the ball section associated with the ball stud, the ball section having the ball seat installed therein is assembled in the housing. To be specific, when the ball stud having the ball seat installed in the ball section is inserted into a mold as a core, a cavity is formed therearound, and insert injection molding in which a resin is injected into this cavity is performed. At this time, the tightening allowance for the ball section is set to an appropriate value by setting a clearance between the ball section and the ball seat to a predetermined value and performing the insert injection molding by appropriately controlling injection conditions of the resin.

Incidentally, in the technique for managing the tightening torque of the housing acting on the ball section associated with Patent Document 1, the following problems may occur in some cases, That is to say, after the insert injection molding, the housing is likely to undergo molding shrinkage (a phenomenon in which the volume of a resin injected into the mold shrinks after cooling). When this molding shrinkage occurs, the housing tightens the ball section associated with the ball stud. As a result, it becomes difficult to precisely manage the torque associated with the sliding of the ball section with respect to the housing.

The present invention is made in view of the above-mentioned circumstances, and an object of the present invention is to provide a ball joint in which a torque associated with the sliding of a ball section with respect to a housing is able to be precisely managed, a stabilizer link using the ball joint, and a stabilizer with the stabilizer link, even when the housing is formed using insert injection h a resin is injected into a mold in a state in which the ball section associated with a ball stud has been inserted into the mold.

Solution to Problem

In order to solve the problems, a ball joint according to an aspect of the present invention includes: a metal ball stud which includes a ball section; and a resin housing which rotatably supports the ball section of the ball stud, wherein a limiting member configured to limit molding shrinkage of the housing is embedded in the housing at an interval with respect to an equatorial section of the ball section such that the limiting member is positioned to surround at least the equatorial section of the ball section.

In the ball joint according to the aspect of the present invention, the limiting member configured to limit the molding shrinkage of a portion of the housing facing the ball section is embedded in the housing at an interval with respect to the equatorial the equatorial section of the ball section.

According to the ball joint associated with the aspect of the present invention, even when the housing is formed using the insert injection molding in which a resin is injected into the mold in a state in which the ball section of the ball stud has been inserted into the mold, it is possible to precisely manage a torque associated with the sliding of the ball section with respect to the housing.

Effects

According to the present invention, even when the housing is formed using the insert injection molding in which a resin is injected into the mold in a state in which the ball section of the ball stud has been inserted into the mold, it is possible to appropriately manage a torque associated with the sliding of the ball section with respect to the housing. Problems, solution means, and effects other than those described above will be clarified through the following description of embodiments.

DESCRIPTION OF EMBODIMENTS

Figure 1:
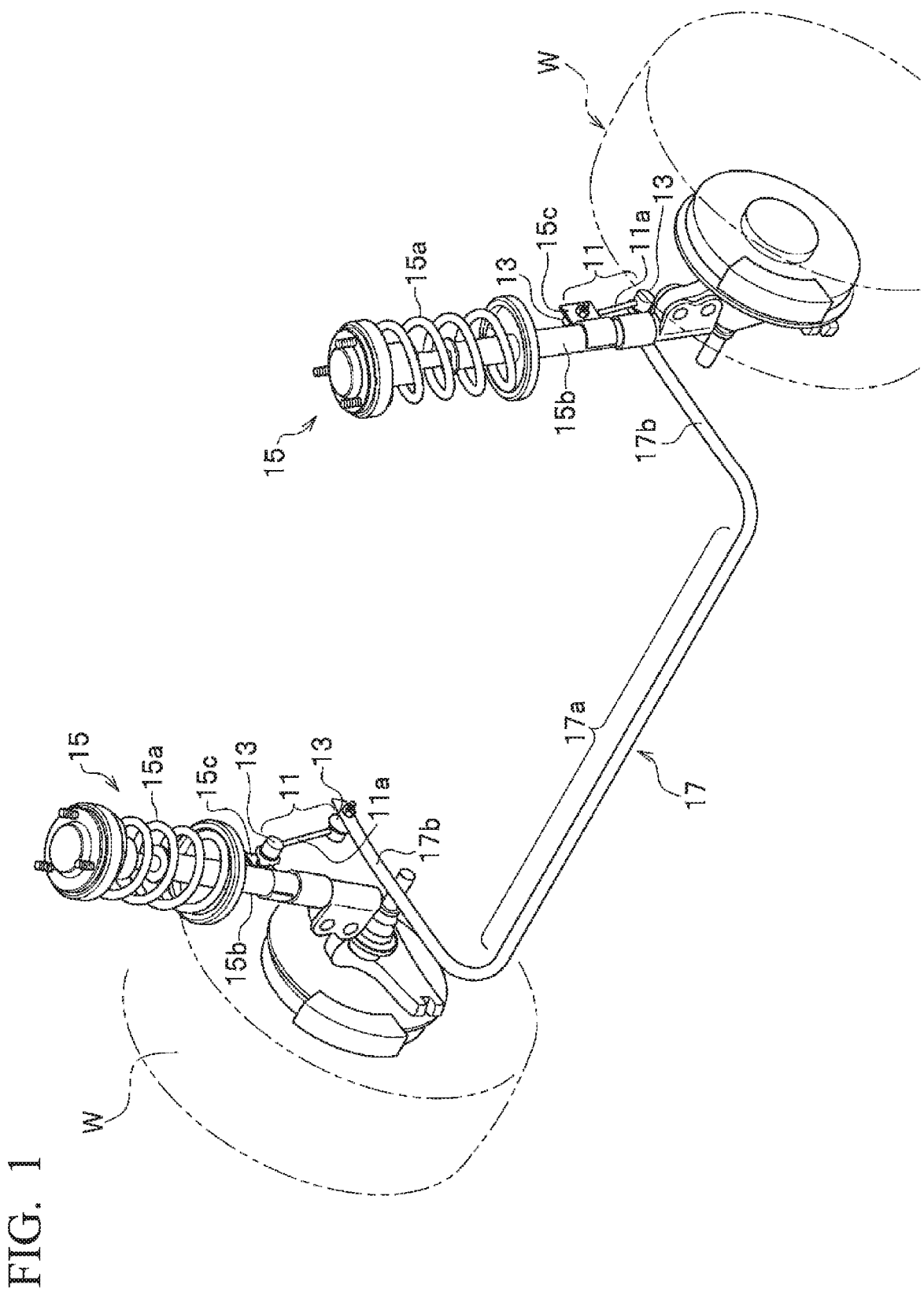
FIG. 1 is a perspective view of a stabilizer link according to an embodiment of the present invention in a state in which the stabilizer link is attached to a vehicle.

A ball joint according to a plurality of embodiments of the present invention, a stabilizer link using this ball joint, and a stabilizer with a stabilizer link will be described in detail below with reference to the drawings as appropriate. Note that, in the drawings mentioned later, the same members or corresponding members will be denoted with the reference numerals.

Stabilizer Link 11 According to Embodiment of Present Invention

First, stabilizer link 11 using ball joints 13 according to an embodiment of the present invention will be described using a case in which the stabilizer link 11 is attached to a vehicle as an example. FIG. 1 is a perspective view of the stabilizer link 11 according to the embodiment of the present invention in a state in which the stabilizer link 11 is attached to the vehicle. It should be noted that, in the following description, a ball joint according to a first embodiment of the present invention will be denoted with reference numeral "13-1," a ball joint according to a modification of the first embodiment will be denoted with reference numeral "13-11," a ball joint according to a second embodiment will be denoted with reference numeral "13-2," and a ball joint according to a third embodiment will be denoted with reference numeral "13-3." It should be noted that, in the specification according to the present invention, when collectively referring to ball joints according to the first to third embodiments, the ball joints will be denoted with reference numeral "13" and a description thereof will be provided.

As illustrated in FIG. 1, wheels W are attached to a vehicle body (not shown) of the vehicle (not shown) with suspension devices 15 therebetween. In order to absorb and reduce shock and vibration transmitted from a road surface to the vehicle body through the wheels W, each of the suspension devices 15 includes a coil spring 15a and a shock absorber 15b.

As illustrated in FIG. 1, the left and right suspension devices 15 are joined to each other with a stabilizer 17 formed of a substantially U-shaped spring steel rod or the like therebetween. In order to increase the roll rigidity of the vehicle body (a resistance force against torsional deformation) and minimize the rolling of the vehicle, the stabilizer 17 includes a torsion bar 17a extending between the left and right wheels W and a pair of arm sections 17b bent and extending from both end portions of the torsion bar 17a. The suspension devices 15 and the stabilizer 17 correspond to a "structure" of the present invention to which a ball stud 21 which will be described later is tightened.

The stabilizer 17 is joined to the shock absorber 15b which supports one of the wheels W with the stabilizer link 11 therebetween. The same applies to the joining on the left and right wheels W side. The stabilizer 17 and the stabilizer link 11 constitute a stabilizer with a stabilizer link. As illustrated in FIG. 1, the stabilizer link 11 is formed by providing the ball joints 13 at both end portions of a rod-shaped support bar 11a formed of, for example, a steel pipe. A distal end portion 11a1 of the support bar 11a plastically deforms into a flat plate shape through press processing.

Here, the stabilizer link 11 according to the embodiment of the present invention is manufactured using an insert injection molding process for injecting a resin which forms a housing 23 into the mold in a state in which at least the support bar 11a and the ball stud 21 are inserted into predetermined positions in a mold. In the following description, when the term "insert injection molding process" is used, it refers to the above-mentioned process.

One ball joint 13 of the pair of ball joints 13 is tightened and fixed to a distal end portion of one of the arm sections 17b of the stabilizer 17 and the other ball joint 13 is tightened and fixed to a bracket 15c of the shock absorber 15b. It should be noted that, although the pair of ball joints 13 in this embodiment have the same configuration, the pair of ball joints may have different configurations.

Ball Joint 13-1 According to First Embodiment of Present Invention

Figure 2A:
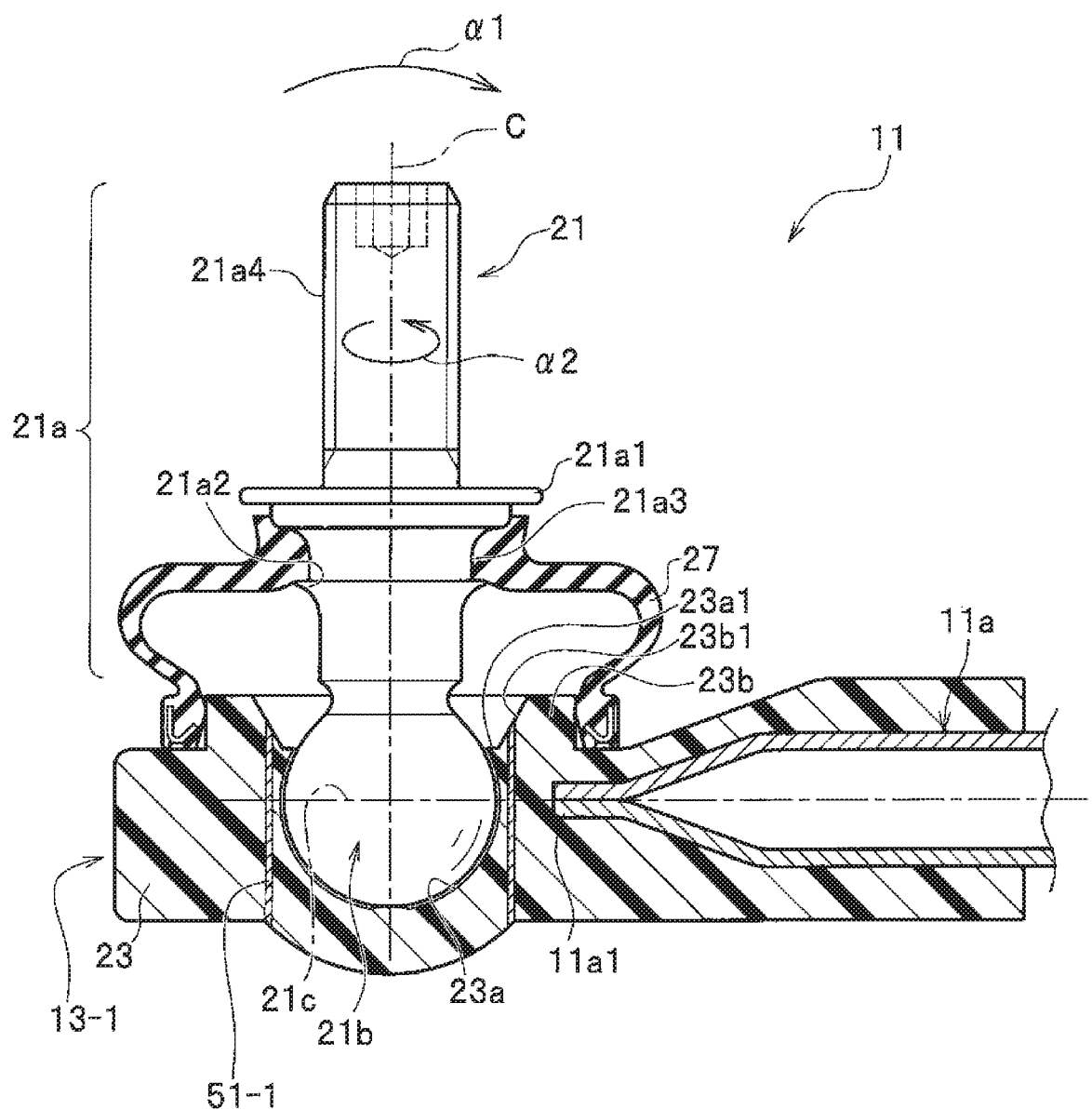
FIG. 2A is a longitudinal cross-sectional view of a ball joint according a first embodiment of the present invention.

The ball joints 13-1 according to the first embodiment of the present invention will be described below with reference to FIG. 2A. FIG. 2A is a longitudinal cross-sectional view of the ball joints 13-1 according to the first embodiment of the present invention. In the following description, unless otherwise ted, an "axial direction" refers to a direction along an axis C of the ball stud 21 (refer to FIG. 2A), a "circumferential direction" refers to a direction around an equatorial section 21c of a ball section 21b (refer to FIG. 2A) (that is, a direction around the axis C), and a "radial direction" refers to a radial direction of the ball section 21b (that is, a direction intersecting the axis C). It should be noted that the equatorial section 21c of the ball section 21b refers to a circumferential portion in which the ball section 21b has a maximum diameter around the axis C of the ball stud 21. In other words, the equatorial section 21c is a portion in an outer surface of the ball section 21b furthest away from the axis C of the ball stud 21 in the radial direction. The longitudinal cross-sectional view of the ball joint in this embodiment is a cross-sectional view of the ball stud 21 taken along the axis C. In other words, the longitudinal cross-sectional view is a cross-sectional vi which includes the axis C of the ball stud 21 and a center axis of the support bar 11a.

As illustrated in FIG. 2A, each of the ball joints 13-1 according to the first embodiment is constituted of the metal ball stud 21 made of steel or the like and the resin housing 23. The ball stud 21 is a shaft member extending in one direction and is configured to include a stud section 21a at one end portion thereof and the spherical ball section 21b at the other end portion thereof. The stud section 21a and the ball section 21b are joined through welding. The stud section 21a and the ball section 21b may be integrally formed. The housings 23 are provided at both ends of the support bar 11a. Each of the housings 23 rotatably supports the ball section 21b of the ball stud 21. In the stabilizer link and the ball joint in this embodiment, a side on which the stud section 21a is provided is referred to as an upper side and a side on which the ball section 21b is provided is referred to as a lower side (or the bottom section side) in some cases.

A large collar section 21a1 and a small collar section 21a2 are formed in the stud section 21a of the ball stud 21 to be separated from each other in the axial direction. A circumferential concave section 21a3 is formed between the large collar section 21a1 and the small collar section 21a2. A male sere 21a4 is provided in the stud section 21a on a distal end side relative to the large collar section 21a1, that is, on a side of the ball stud 21 different from the ball section 21b side.

In order to rotatably support the ball section b of the ball stud 21, as illustrated in FIG. 2A, a hemispherical concave section 23a is formed in a portion of the housing 23 which accommodates the ball section 21b. An annular convex flange 23b is formed in an upper portion of the housing 23. The convex flange 23b includes a conical tapered section 23b1 in contact with an opening peripheral section 23a1 of the hemispherical concave section 23a and extending to be inclined in the radial direction. An inclination angle of the tapered section 23b1 with respect to the axis C is set to an appropriate value in accordance with a swing angle, a shaft diameter, and the like of the ball stud 21.

A circumferential dust cover 27 made of an elastic material such as rubber is installed between the convex flange 23b of the housing 23 and the circumferential concave section 21a3 of the stud section 21a to cover a gap therebetween. The dust cover 27 prevents rainwater, dust, and the like from entering the ball joint 13-1.

Examples of a resin material of the housing 23 include PA66-GF30 (obtained by mixing 30 to 50% by weight of a glass fiber with PA66/melting point: about 270° C.) in consideration of having thermoplasticity (to form the housing using insert injection molding), meeting predetermined strength requirements, and the like. Here, as the resin material of the housing 23, materials such as engineering plastics such as polyetheretherketone (PEEK), Polyamide 66 (PA66), polyphenylene sulfide resins (PPS), and polyoxymethylene (POM), super engineering plastics, fiber reinforced plastics (FRPs), glass reinforced plastics (GRPs: glass fiber reinforced plastics), and carbon fiber reinforced plastics (CFRP) can be appropriately used in addition PA66-GF30. It should be noted that a resin used for molding the housing 23 is referred to as a second resin for convenience of explanation.

In the ball joint 13-1 according to the first embodiment, since an outer peripheral surface of the ball section 21b accommodated in the hemispherical concave section 23a of the housing 23 slides while in contact with an inner peripheral surface of the hemispherical concave section 23a, the ball stud 21 is supported with respect to the housing 23 to be swingable (refer to an arrow α1 in FIG. 2A) and rotatable (refer to an arrow α2 in FIG. 2A). In this way, the suspension devices 15 and the stabilizer 17 are smoothly joined using the ball joint 13-1 included in the stabilizer link 11.

In the first embodiment, the insert injection molding process used when the stabilizer link 11 is manufactured is performed in a state in which the ball joint 131 having the ball section 21b of the ball stud 21 is inserted in a predetermined position in the mold. After the insert injection molding, the housing 23 may undergo molding shrinkage in some cases.

Thus, in the ball joint 3-1 according to the first embodiment, for example, as illustrated in FIG. 2A, a limiting ember 51-1 according to the first embodiment configured to limit molding shrinkage of a portion of the housing 23 facing the ball section 21b is embedded in the housing 23 at a predetermined interval with respect to the equatorial section 21c of the ball section 21b such that the limiting member 51-1 is positioned to substantially surround at least the equatorial section 21c of the ball section 21b. Although a limiting member 51 surrounds the ball section 21b from the outer side in the radial direction, the limiting member may surround the equatorial section 21c of the ball section 21b over the entire circumference thereof and a part of the equatorial section 21c over the entire circumference thereof. The limiting member 51 is provided away from the ball section 21b and a part of the housing 23 (a portion thereof in which the hemispherical concave section 23a is formed) is positioned in a gap between the limiting member 51 and the ball section 21b in the radial direction.

According to the ball joint 13-1 associated with e first embodiment, it is possible to appropriately manage a torque associated with the sliding of the ball section 21b with respect to the housing 23 even when the housing 23 is formed through the insert injection molding in which a resin is injected into the mold in a state in which the ball section 21b of the ball stud 21 has been inserted into e mold.

(Configuration of Limiting Member 51]

A configuration of the limiting member 51 which is a main component in the stabilizer link 11 according to the embodiment of the present invention will be described with reference to FIGS. 3A to 3D as appropriate. Fla 3A is a plan view similarly used for describing limiting members 51a to 51c associated with Examples 1 to 3. FIGS. 3B to 3D are front views of limiting members 51a to 51c associated with Examples 1 to 3. It should be noted that, in the specification according to the present invention, when collectively referring to the limiting member 51a to a limiting member 51e according to Examples 1 to 5, the limiting members will be denoted with reference numerals "51".

Figure 3A:
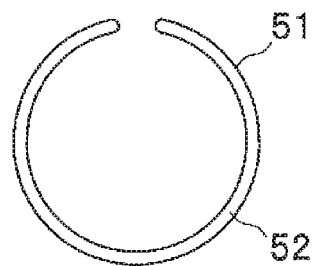
FIG. 3A is a plan view similarly used for describing Examples 1 to 3 of a limiting member which is a main component in a stabilizer link according to an embodiment of the present invention.
Figure 3B:
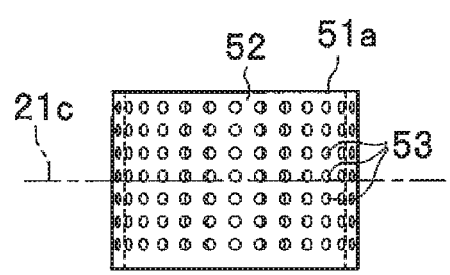
FIG. 3B is a front view of as limiting member according to Example 1.
Figure 3C:
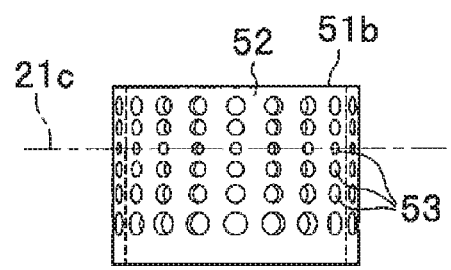
FIG. 3C is a front view of a limiting member according to Example 2.
Figure 3D:
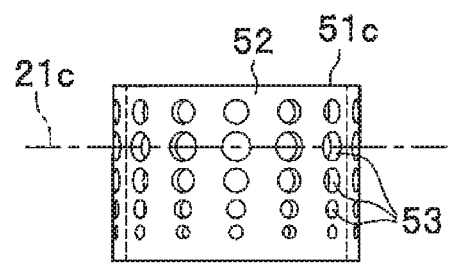
FIG. 3D is a front view of a limiting member according to Example 3.

As illustrated in FIG. 3A, the limiting member 51a associated with Example 1 is formed in a substantially circular shape when viewed in a plan view. This applies to the limiting members 51b to 51e associated with Examples 2 to 5 which will be described later.

Also, as illustrated in FIG. 3B, the limiting member 51a associated with Example 1 is formed in a substantially rectangular shape when viewed in a front view. In short, as illustrated in FIGS. 3A and 3B, the limiting member 51a associated with Example 1 is formed in a substantially cylindrical shape.

When the limiting member 51a associated with Example 1 formed in a substantially cylindrical shape is obtained, a cylindrical material may be cut into an appropriate length and used. Furthermore, the limiting member 51a associated with Example 1 may be obtained by winding a rectangular flat plate material in a cylindrical shape.

Examples of a material of the limiting member 51a associated with Example 1 include metals such as iron, copper, and aluminum. However, as the material of the limiting member 51a associated with Example 1, a resin such as PEEK having good heat resistance, good high temperature characteristics, and high mechanical strength may be used. That is to say, when the limiting member of this embodiment is formed of a resin, it is necessary to have heat resistance against heat applied in the insert injection molding process. This applies to the limiting members 51b to 51e associated with Examples 2 to 5 which will be described later.

In the insert injection molding process, a thickness limiting member 51a associated with Example 1 may be appropriately changed in consideration of not being plastically deformed and being as thin as possible when a resin injection pressure is applied. This applies to the limiting members 51b to 51e associated with Examples 2 to 5 which will be described later.

As the limiting member 51-1 associated with the first embodiment, any of the limiting members 51a to 51c associated with Examples 1 to 3 can be used as appropriate. Here, the limiting member 51-1 associated with the first embodiment means a limiting member used for the ball joint 13-1 associated with the first embodiment. Accordingly, the limiting members 51-2 and 51-3 associated with the second and third embodiments which will be described later mean limiting members used for the ball joints 13-2 and 13-3 associated with the second and third embodiments which will be described later. Furthermore, the limiting members 51a to 51c associated with Examples 1 to 3 represent an aspect of limiting members applicable as the limiting member 51-1 associated with the first embodiment and the limiting members 51-2 and 51-3 associated with the second and third embodiments.

As illustrated in FIG. 2A, the limiting member 51-1 associated the first embodiment is provided to pass through the housing 23 in the axial direction. In the insert injection molding process, a resin is injected to the limiting member 51-1 provided to surround the ball section 21b in the ball stud 21 in a state in which both end portions thereof in the axial direction are fixed and positioned at predetermined positions in the mold.

If the limiting member 51-1 is provided to surround the ball section 21b in the ball stud 21, in the insert injection molding process, a circumferential side wall 52 of the limiting member 51-1 (refer to FIGS. 3A to 3D) separates an inside and an outside thereof (an inner side and an outer side thereof in the radial direction). Thus, a flow of a resin between the inside and the outside of the limiting member 51-1 is prevented.

Thus, as illustrated in FIG. 3B, in the limiting member 51a associated with Example 1 applied as the limiting member 51-1 associated with the first embodiment, a plurality of through holes 53 (through holes) open over the entire surface of the circumferential side wall 52. That is to say, the plurality of through holes 53 configured to pass through in the radial direction are provided in the circumferential side wall 52 of the limiting member 51-1. A shape, sizes, a quantity, and arrangement positions of the through holes 53 may be appropriately changed in consideration of a good resin flow between an inside and an outside of limiting member 51-1 (refer to FIG. 2A). Appropriate change of the through holes 53 with respect to a shape, sizes, a quantity, and arrangement positions thereof is also performed in the same manner in the limiting members 51b to 51e associated with Examples 2 to 5 which will be described later.

According to the limiting member 51a associated with Example 1, since the plurality of through holes 53 are provided over the entire surface of the circumferential side wall 52, it is possible to appropriately adjust a torque associated with the sliding of the ball section 21b with respect to the housing 23.

Since the limiting member 51 configured to surround the ball section 21b is provided, the limiting member 51 can support a force generated due to the contraction of the housing 23 and the limiting member 51 can minimize the tightening of the housing to the ball section 21b even when the housing 23 undergoes molding shrinkage at the time of insert injection molding. For this reason, it is possible to adjust a torque associated with the sliding of the ball section 21b with respect to the housing 23 to a desired value.

In the limiting member 51b associated with Example 2, as illustrated in FIG. 3C, the sizes of the plurality of through holes 53 provided over the entire surface of the circumferential side wall 52 differ in accordance with a change in positions thereof in the axial direction as compared with the limiting member 51a associated with Example 1, In the example of FIG. 3C, the sizes of the through holes 53 present in a region of the ball section 21b corresponding to the equatorial section 21c in the circumferential side wall 52 of the limiting member 51b are set to minimum sizes in the axial direction. Furthermore, in the limiting member 51b associated with Example 2, as illustrated in FIG. 3C, the sizes of the through holes 53 provided over the entire surface of the circumferential side wall 52 are set to have a larger size as the through holes 53 become further away from the portion of the ball section 21b corresponding to the equatorial section 21c.

In the limiting member 51c associated with Example 3, as illustrated FIG. 3D, the sizes of the plurality of through holes 53 provided over the entire surface of the circumferential side wall 52 differ in accordance with a change in positions thereof in the axial direction as in the limiting member 51b associated with Example 2. In the example of FIG. 3D, unlike the limiting member 51b associated with Example 2, the sizes of the through holes 53 present in the portion of the ball section 21b corresponding to the equatorial section 21c in the circumferential side wall 52 of the limiting member 51c are set to have maximum sizes in the axial direction. Furthermore, in the limiting member 51c associated with Example 3, as illustrated in FIG. 3D, the sizes of the through holes 53 provided over the entire surface of the circumferential side wall 52 are set to have smaller sizes as the through holes 53 become further away from the portion of the ball section 21b corresponding to the equatorial section 21c.

According to the limiting members 51b and 51c associated with Examples 2 and 3, since the sizes of the plurality of through holes 53 provided over the entire surface of the circumferential side wall 52 are set to be different in accordance with a change in positions thereof in the axial direction, it is possible to finely adjust a torque associated with the sliding of the ball section 21b with respect to alae housing 23 in association ti the positions thereof in the axial direction.

Figure 2B:
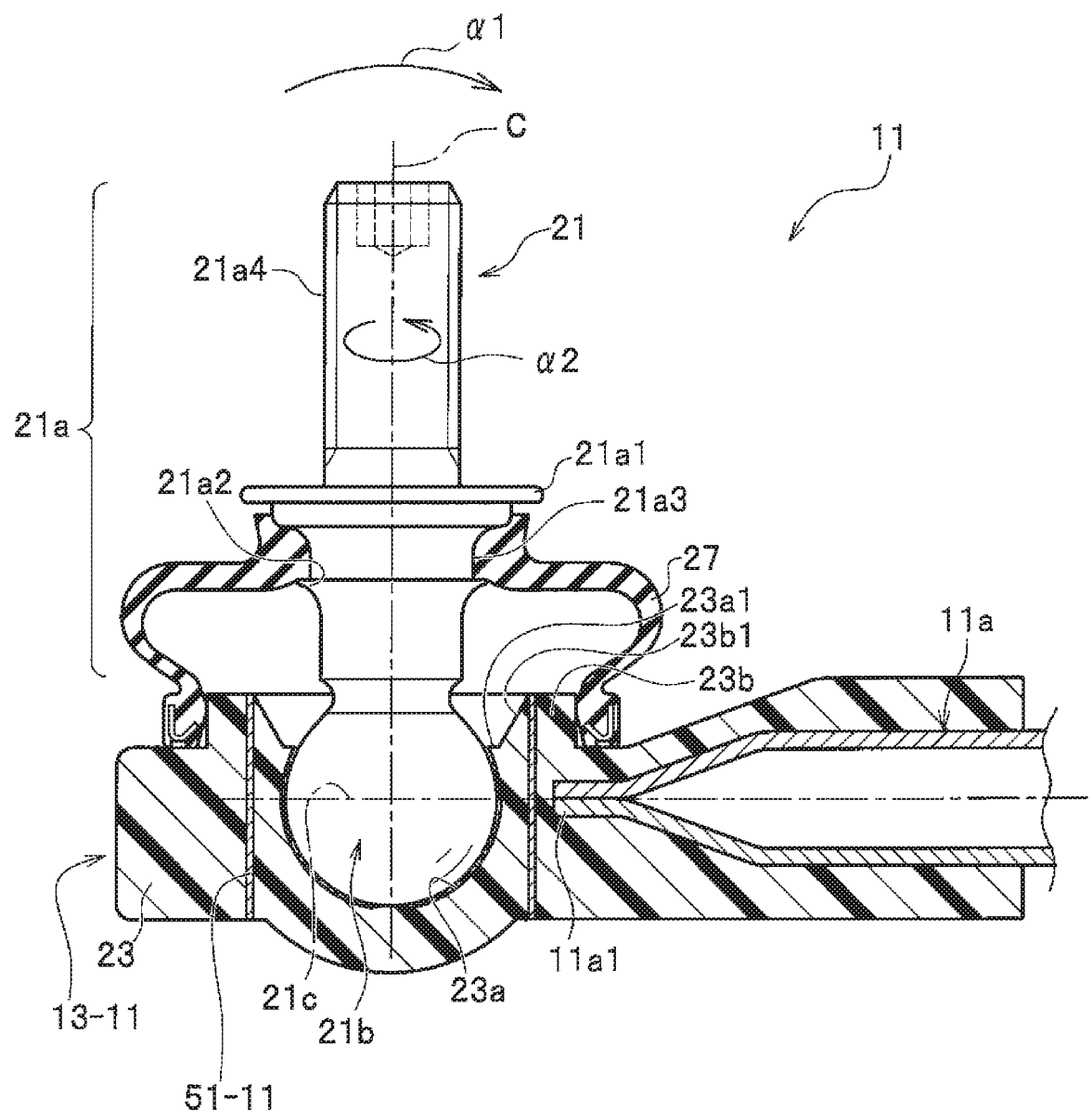
FIG. 2B is a longitudinal cross-sectional view of a ball joint according to a modification of the first embodiment of the present invention.

In the ball joint 13-11 associated with a modification of the first embodiment, as illustrated in comparison between FIGS. 2A and 2B, a gap between the limiting member 51-11 associated with the modification of the first embodiment and the equatorial section 21c of the ball section 21b is wider than that for the limiting member 51-1 associated with the first embodiment. In this way, by appropriately adjusting a relative positional relationship of the limiting member 51 with respect to the equatorial section 21c of the ball section 21b, it is possible to arbitrarily finely adjust a degree of restriction of molding shrinkage associated with the housing 23.

(Ball Joint 13-2 According to Second Embodiment of Present Invention)

Figure 4:
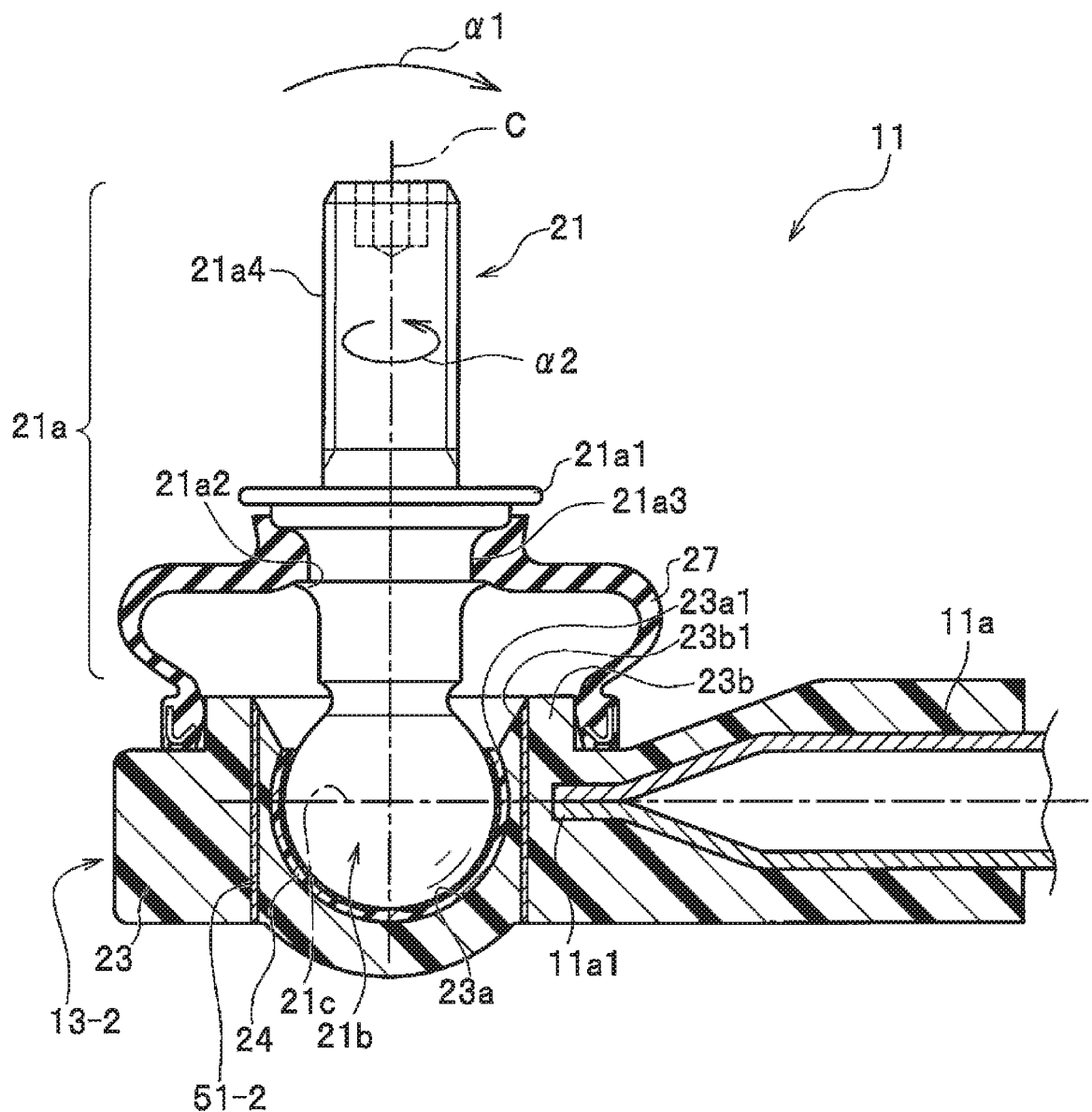
FIG. 4 is longitudinal cross-sectional view of a ball joint according to a second embodiment of the present invention.

The ball joint 13-2 according to the second embodiment of the present invention will be described below with reference to FIG. 4. FIG. 4 is a longitudinal cross-sectional view of the ball joint 13-2 according to the second embodiment of the present invention.

The ball joint 13-1 according to the first embodiment of the present invention and the ball joint 13-2 according to the second embodiment of the present invention have more similar constituent elements than different constituent elements. Thus, description will be replaced with description concerning the ball joint 13-2 according to the second embodiment of the present invention, and description will be provided by focusing on differences in configuration between these ball joints.

In the hail joint 13-1 according to the first embodiment of the present invention, as illustrated in FIG. 2A, since the outer peripheral surface of the ball section 21b in the ball stud 21 is in direct contact with the inner peripheral surface of the hemispherical concave section 23a in the housing 23, a joining mechanism is constituted.

On the other and, in the ball joint 13-2 according to the second embodiment of the present invention, as illustrated in FIG. 4, since a resin ball seat 24 is disposed between the outer peripheral surface of the ball section 21b in the ball stud 21 and the inner peripheral surface of the hemispherical concave section 23a in the housing 23, a joining mechanism is constituted. The ball seat 24 is formed of a resin as a single body to cover more than half the outer surface of the ball section 21b. The ball seat 24 is manufactured through a single injection molding process.

Since the outer peripheral surface of the ball section 21b accommodated in the hemispherical concave section 23a of the housing 23 slides while in contact with the inner peripheral surface of the ball seat 24, the ball stud 21 is supported with respect to the housing 23 to be swingable (refer to an arrow α1 in FIG. 4) and rotatable (refer to an arrow α2 in FIG. 4). In this way, the suspension devices 15 is smoothly joined to the stabilizer 17 using the ball joint 13 provided in the stabilizer link 11.

In the ball joint 13-2 according to the second embodiment configured as described above, as illustrated in FIG. 4, the limiting member 51-2 according to the second embodiment is embedded in the housing 23 at a predetermined interval with respect to the equatorial section 21c of the ball section 21b such that the limiting member 51-2 is positioned to substantially surround at least the equatorial section 21c of the ball section 21b as in the ball joint 13 according to the second embodiment.

As the limiting member 51-2 according to the second embodiment, any one of the limiting members 51a to 51c associated with Examples 1 to 3 may be applied.

According to the ball joint 13-2 associated with the second embodiment, even when the housing 23 is formed using the insert injection molding in which a resin is injected into the mold in a state in which the ball seat 24 having the ball section 21b of the ball stud 21 accommodated therein has been inserted into the mold, it is possible to appropriately manage a torque associated with the sliding of the ball section 21b with respect to the housing 23.

(Ball Joint 13-3 According to Third Embodiment of Present Invention)

Figure 5:
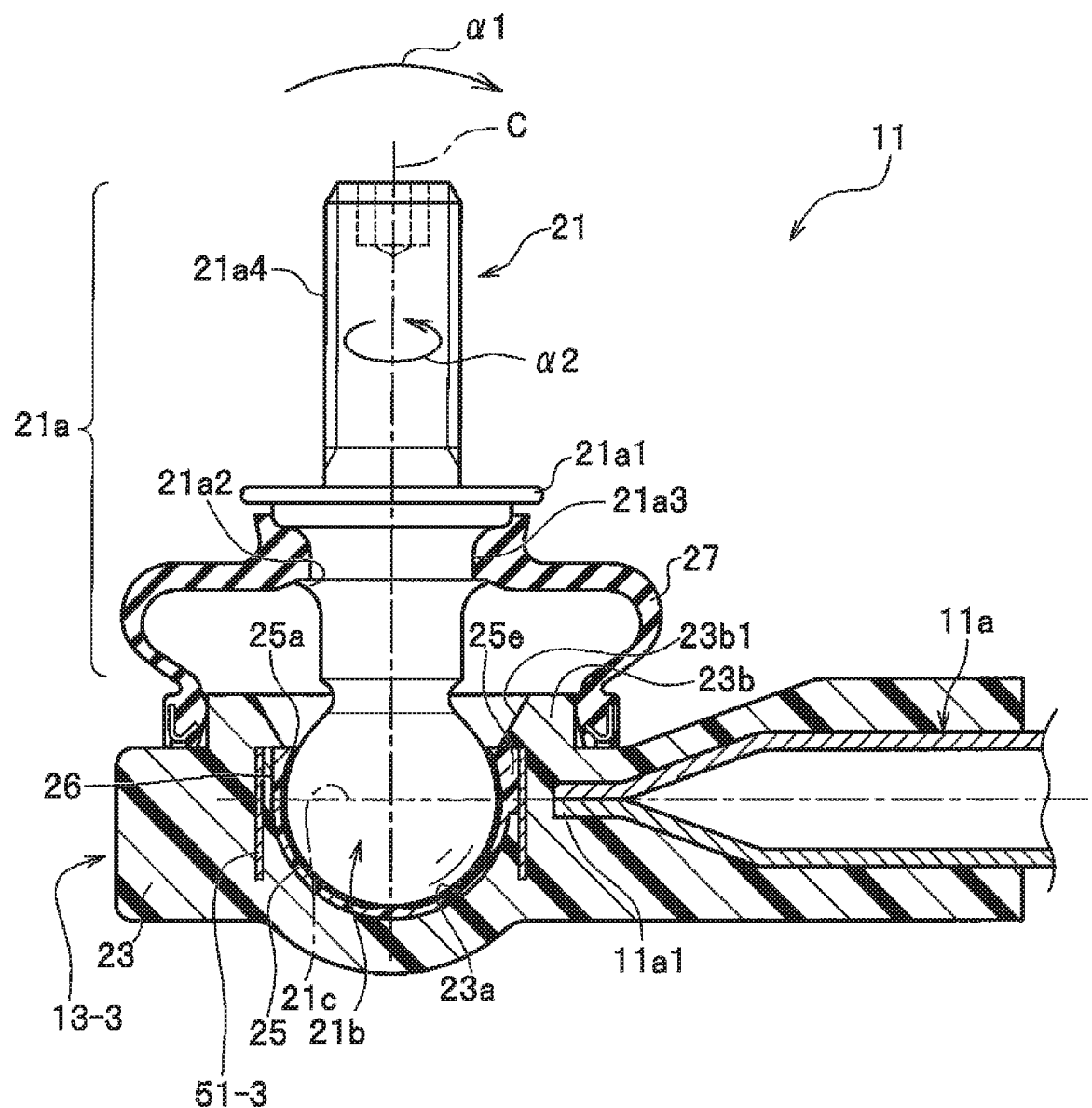
FIG. 5 is a longitudinal cross-sectional view of a ball joint according to a third embodiment of the present invention.

The ball joint 13-3 according to the third embodiment of the present invention will be described below with reference to FIG. 5. FIG. 5 is a longitudinal cross-sectional view of the ball joint 13-3 according to the third embodiment of the present invention. It should be noted that FIG. 5 illustrates a longitudinal cross section taken along line V-V shown in FIG. 6B.

The ball joint according to the first embodiment of the present invention and the ball joint 13-3 according to the third embodiment of the present invention have more similar constituent elements than different constituent elements. Thus, description will be replaced the description concerning the hail joint 13-3 according to the third embodiment of the present invention, and description will be provided by focusing on differences in configuration between these ball joints.

In the ball joint 13-1 according to the first embodiment of the present invention, as illustrated in FIG. 2A, since the outer peripheral surface of the ball section 21b in the ball stud 21 is in direct contact with the inner peripheral surface of the hemispherical concave section 23a in the housing 23, a joining constituted.

On the other hand, in the ball joint 13-3 according to the third embodiment of the present invention, as illustrated in FIG. 5, since a resin ball seat 25 disposed between the outer peripheral surface of the ball section 21b in the ball stud 21 and the inner peripheral surface of the hemispherical concave section 23a in the housing 23, a joining mechanism is constituted. The ball seat 25 is forged of a first resin as a single body to cover more than half the outer surface of the ball section 21b. The ball seat 25 is manufactured through a single injection molding process using the first resin.

(Ball Seat 25)

Figure 6A:
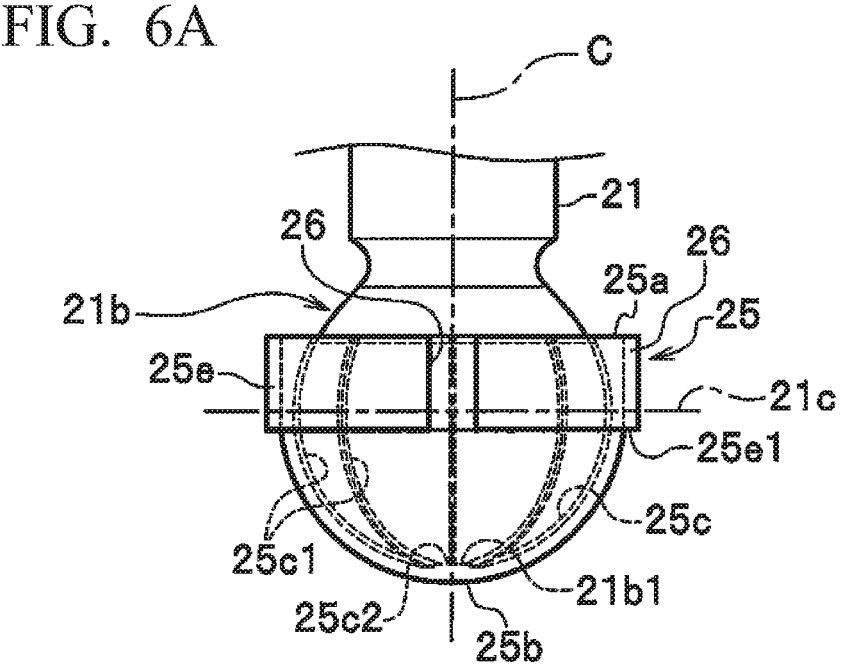
FIG. 6A is a front view illustrating a state in which a cutout section is provided in a flange section in a ball seat used for a ball joint according to the third embodiment.
Figure 6B:
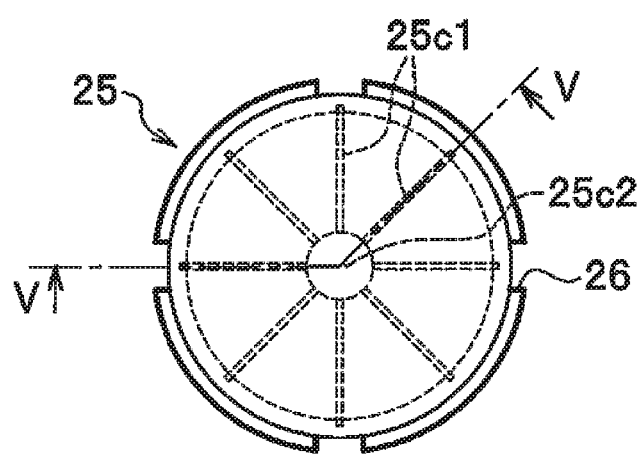
FIG. 6B is a bottom view of the ball seat illustrated in FIG. 6A when viewed from a bottom section side.

A detailed structure of the ball seat 25 will be described below with reference to FIGS. 6A and 6B. FIG. 6A is a front view illustrating a state in which a cutout section is provided in a flange section 25e of the ball seat 25 used for the ball joint 13-3 according to the third embodiment. FIG. 6B is a bottom view of the ball seat 25 illustrated in FIG. 6A when viewed from a bottom section 25b side.

As illustrated in FIG. 6A, the ball seat 25 is configured to include an accommodation section 25c formed using a spherical inner peripheral surface which covers more than half a spherical outer peripheral surface of the ball section 21b in the ball stud 21. The accommodation section 25c forms an accommodation section for the ball section 21b.

Here, the insert injection molding process used when the stabilizer link 11 is manufactured is performed by injecting a second resin in a state in which the ball joint 13 having the ball stud 21 with the ball seat 25 installed in the ball section 21b has been inserted into the mold. That is to say, the ball seat 25 formed of the first resin is also exposed to an injection temperature and an injection pressure of the second resin which forms the housing 23 used for the insert injection molding process. In this case, there are a concern concerning the ball seat 25 softened by being exposed to the injection temperature and the injection pressure of the second resin and a torque associated with the sliding of the ball section 21b with respect to the housing 23 which cannot be appropriately managed due to the deformation and collapse of the ball seat 25 accompanying this softening.

Thus, in the ball joint 13-3 according to the third embodiment of the present invention, an inner diameter dimension of the accommodation section 25c at the time of molding the ball seat 25 is set to have a larger dimension by an amount corresponding to a molding shrinkage allowance of the first resin which forms the ball seat 25 after the injection molding and a molding shrinkage allowance of the second resin after the insert injection molding using the injection temperature and the injection pressure of the second resin which forms the housing 23 at the time of insert injection molding. Thus, even if an inner diameter of the accommodation section 25c of the ball seat 25 decreases due to the molding shrinkage of the first resin after the injection molding and the molding shrinkage of the second resin after the insert injection molding owing to the injection temperature and the injection pressure of the second resin, it is possible to appropriately maintain a torque generated between the inner peripheral surface of the accommodation section 25c and the outer peripheral surface of the ball section 21b.

As illustrated in FIGS. 6A and 6B, a plurality of groove sections 25c1 extending along a longitude line are provided in the accommodation section 25c of the ball seat 25. The plurality of groove sections 25c1 are filled with a lubricant such as grease to reduce a frictional force generated between the outer peripheral surface of the ball section 21b and the accommodation section 25c of the ball seat 25.

The plurality of groove sections 25c1 are provided at equal intervals in the equatorial section 21c of the ball section 21b. In the example illustrated in FIG. 6A, eight groove sections 25c1 are provided. A dimension of the groove sections 25c1 is not particularly limited, but may be, for example, 0.3 mm or less in width and 0.3 mm or less in depth in consideration of reducing a degree of crushing.

As illustrated in FIGS. 6A and 6B, a lubricant chamber 25c2 which includes a concave section capable of accommodating a lubricant is provided in an inner bottom section of the accommodation section 25c of the ball seat 25 on the bottom section 25b side which faces a tip section 21b1 (a bottom tip section) of the ball section 21b.

As illustrated in FIG. 5, the circumferential flange section 25e is formed in the ball seat 25 over a region including the opening peripheral section 25a. A maximum outer diameter dimension of the flange section 25e is set to be larger than a maximum outer diameter dimension of the ball section 21b. To be specific, for example, the maximum outer diameter dimension of the flange section 25e is set to a dimension obtained by adding a predetermined dimension (for example, about 2 to 4 mm) to the maximum outer diameter dimension (a spherical diameter) of the ball section 21b. Thus, the flange section 25e serves as a receiving section which receives a removing force applied when a male sphere section (not shown) is forcibly removed from an accommodation space (having an overhanging portion) for the ball section 21b in the ball seat 25 which has been manufactured using the injection molding process.

As illustrated in FIG. 6A, a circumferential edge 25e1 of the flange section 25e on the tip section 21b1 side of the ball section 21b extends from the opening, peripheral section 25a to hang down to a position at which the circumferential edge 25e1 covers at least the equatorial section 21c of the ball section 21b. Thus, it is possible to prevent buckling deformation of the ball seat 25 which is likely to occur when the male sphere section is forcibly removed from the accommodation section 25c of the ball seat 25 which has been manufactured using the injection molding process.

An inner diameter dimension of the opening peripheral section 25a of the ball seat 25 is set to be smaller than the maximum outer diameter dimension of the ball section 21b. To be specific, for example, the inner diameter dimension of the opening peripheral section 25a is set to a value obtained by multiplying the maximum outer diameter dimension (the spherical diameter) of the ball section 21b by a predetermined coefficient (0.90 to 0.98). In short, the opening peripheral section 25a of the ball seat 25 is configured to overhang with respect to the ball section 21b. Thus, the ball seat 25 can reliably wrap around the ball section 21b of the ball stud 21 and hold the ball section 21b.

Examples of a material of the first resin used for molding the ball seat 25 include polybutylene terephthalate (PBT)/melting point: about 230° C., polyamide 46 (PA46)/melting point: about 270° C., polyetheretherketone (PEEK)/melting point: about 340° C., and the like in consideration of the ball seat 25 having thermoplasticity (because the ball seat 25 is formed using injection molding), the ball seat 25 satisfying predetermined wear durability requirements, and the ball seat 25 having a melting point equal to or higher than a melting point of a material of the second resin which forms the housing 23 (for example, about 270° C.). The reason why the resin material having a melting point equal to or higher than the melting point of the material of the second resin which forms the housing 23 is selected as the material of the first resin which forms the ball seat 25 is because it is then possible to minimize deformation and crushing accompanying the softening of the ball seat 25 during the insert injection molding.

In the ball joint 13-3 according to the third embodiment, since the outer peripheral surface of the ball section 21b accommodated in the hemispherical concave section 23a of the housing 23 slides while in contact with the inner peripheral surface of the ball seat 25, the ball stud 21 is supported with respect to the housing 23 to be swingable (refer to an arrow α1 in FIG. 5) and rotatable (refer to an arrow α2 in FIG. 5). In this way, the suspension devices 15 are smoothly joined to the stabilizer 17 through the ball joint 13-3 provided in the stabilizer link 11.

In the ball joint 13-3 according to the third embodiment configured as described above, as in the ball joint 13 according to the second embodiment, as illustrated in FIG. 5, the member 51-3 according to the third embodiment is embedded in the housing 23 at a predetermined interval with respect to the equatorial section 21c of the ball section 21b such that the limiting member 51-3 is positioned to substantially surround at least the equatorial section 21c of the ball section 21b.

As the limiting member 51-3 according to the third embodiment, any one of the ng members 51a to 51c associated with Examples 1 to 3 may be applied.

A method of attaching the limiting member 51-3 in the ball joint 13-3 according to the third embodiment is different from that in the ball joints 13-1 and 13-2 according to the first and second embodiments.

That is to say, in the ball joints 13-1 and 13-2 according to the first and second embodiments, as illustrated in FIGS. 2A and 4, the limiting members 51-1 and 51-2 according to the first and second embodiments are provided to pass through the housing 23 in the axial direction.

On the other hand, in the ball joint 13-3 according to the third embodiment, as illustrated in FIG. 5, the limiting member 51-3 according to the third embodiment is provided to be included in the housing 23. To be specific, the limiting member 51-3 according to the third embodiment is provided to hold (support) around the flange section 25e of the ball seat 25.

If the limiting member 51-3 is provided to hold around the flange section 25e of the ball seat 25, since the circumferential side wall 52 of the limiting member 51-3 (refer to FIGS. 3A to 3D) separates the inside and the outside thereof in the insert injection molding process, a flow of a resin between the inside and the outside of the limiting member 51-3 is prevented.

Thus, as illustrated in FIGS. 6A and 6B, a plurality of groove-shaped cutout sections 26 in the axial direction are provided at equal interval in an outer peripheral edge portion of the flange section 25e of the ball seat 25. A shape and a quantity of the cutout sections 26 may be appropriately changed in consideration of a good flow of a resin between the inside and the outside of the limiting member 51-3 (refer to FIG. 5).

According to the ball joint 13-3 associated with the third embodiment, even when the housing 23 is formed using the insert injection molding in which the resin is injected into the mold in a state in which the ball seat 25 having the ball section 21b of the ball stud 21 accommodated therein has been inserted into the mold, it is possible to appropriately manage a torque associated with the sliding of the ball section 21b with respect to the housing 23.

(Configuration of Limiting Members 51d and 51e According to Examples 4 and 5)

Figure 7A:
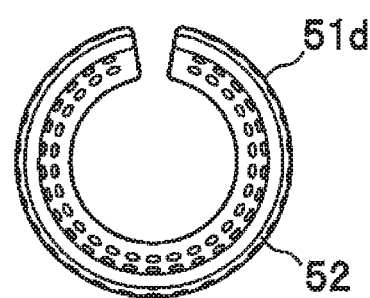
FIG. 7A is a plan view of a limiting member according to Example 4.
Figure 7B:
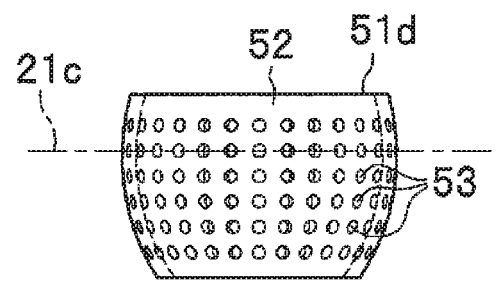
FIG. 7B is a front view of the g member according to Example 4.
Figure 8A:
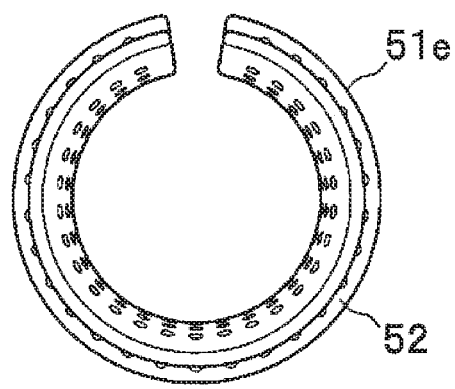
FIG. 8A is a plan view of a limiting member according to Example 5.
Figure 8B:
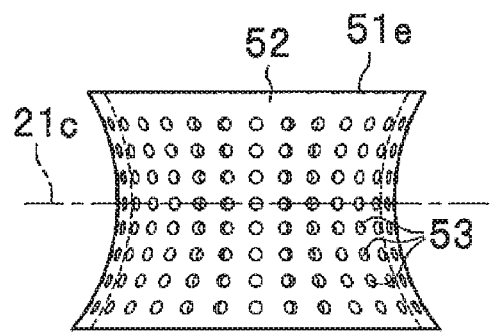
FIG. 8B is a front view of the limiting member according to Example 5.

A configuration of the limiting members 51d and 51e associated with Examples 4 and 5 will be described below with reference to FIGS. 7A, 7B, 8A, and 8B as appropriate. FIG. 7A is a plan view of the limiting member 51d associated with Example 4. FIG. 79 is a front view of the limiting member 51d associated with Example 4. FIG. 8A is a plan view of the limiting member 51e associated with Example 5. FIG. 8B is a front view of the limiting member 51e associated with Example 5.

The limiting member a associated with Example 1 (refer to FIG. 3B) and the limiting members 51d and 51e associated with Examples 4 and 5 (refer to FIGS. 7A, 7B, 8A, and 8B) have more similar constituent elements than different constituent elements. Thus, description will be replaced with description concerning the limiting members 51d and 51e associated with Examples 4 and 5, and description will be provided by focusing on differences in configuration between these ball joints.

In the limiting member 51a associated with Example 1 (refer to FIG. 39), the circumferential side wall 52 thereof is formed in a cylindrical shape.

On the other hand, in the limiting member 51d associated with Example 4, as illustrated in FIGS. 7A and 79, the circumferential side wall 52 thereof is formed in a barrel shape. In the example illustrated in FIG. 7B, a portion of the ball section 21b in the axial direction corresponding to the equatorial section 21c most bulges outward.

Also, in the limiting member 51e associated with Example 5, as illustrated in FIGS. 5A and 8B, the circumferential side wall 52 thereof is formed in an inverted barrel shape (a drum shape) with a narrowed central portion in the axial direction. In the example illustrated in FIG. 8B, a portion of the ball section 21b in the axial direction corresponding to the equatorial section 21c most narrows inward.

It should be noted that a combination of the configurations of the limiting members 51b and 51c associated with Examples 2 and 3 may be applied to any of the limiting members 51d awl 51e associated with Examples 4 and 5.

(Effects Attained by Ball Joint 13 According to Embodiment of Present Invention)

Effects attained by the ball joint 13 according to the embodiment of the present invention will be described below. A ball joint 13 according to an aspect (1) of the present invention s the ball joint 13 including the ball stud 21 which has one end tightened to the suspension devices 15 and the stabilizer 17 (the structure) and the other end having the ball section 21b and the resin housing 23 which rotatably supports the ball section 21b of the ball stud 21, in which the limiting member 51 configured to limit the molding shrinkage of the housing 23 is embedded in the housing 23 at a predetermined interval with respect to the equatorial section 21c of the ball section 21b such that the limiting member 51 is positioned to substantially surround at least the equatorial section 21c of the ball section 21b.

In the ball joint 13 according to the aspect (1) of the present invention the insert injection molding process, the limiting member 51 embedded in the housing 23 acts to limit the molding, shrinkage of the second resin which forms the housing 23 of a portion of the limiting member 51 present outside.

According to the ball joint 13 associated with the aspect (1) of the present invention, even when the housing 23 is formed using the insert injection molding in which a resin is injected into the mold in a state in which the ball section 21b of the ball stud 21 has been inserted into the mold, it is possible to accurately manage a torque associated with the sliding of the ball section 21b with respect to the housing 23.

Also, a ball joint 13 according to an aspect (2) of the present invention corresponds to the ball joint 13 according to the aspect (1) of the present invention, which further includes the resin ball seats 24 and 25 which are provided to be disposed between the housing 23 and the ball section 21b and each include the accommodation section of the ball section 21b and in which the limiting member 51 is provided to surround the ball seats 24 and 25.

In the ball joint 13 according to the aspect (2) of the present invention, since the limiting member 51 is provided to surround the ball seats 24 and 25, it is possible to attain the same effects as in the ball joint 13 according to the aspect (1) of the present invention in the ball joint 13 of the aspect including the ball seats 24 and 25.

Also, a ball joint 13 according to an aspect (3) of the present invention corresponds to the ball joint 13 according to the aspect (2) of the present invention, in which the ball seat 25 covers more than half the outer surface of the ball section 21b including at least a region from the bottom tip section of the ball section 21b to the equatorial section 21c, the flange section 25e is formed in a region of the ball seat 25 including the opening peripheral section 25a thereof, and the limiting member 51-3 is provided to support the outer peripheral edge portion of the flange section 25e of the ball seat 25.

According to the ball joint 13 associated with the aspect (3) of the present invention, since the limiting member 51-3 is provided to support the outer peripheral edge portion of the flange section 25e of the ball seat 25, it is possible to easily perform work of incorporating the limiting member 51-3 into a predetermined position of the mold in the insert injection molding process in addition to the same effects as in the ball joint 13 according to the aspect (2) of the present invention.

Also, a ball joint 13 according to an aspect (4) of the present invention corresponds to the ball joint 13 according to the aspect (3) of the present invention, in which the cutout sections 26 are provided in the outer peripheral edge portion of the flange section 25e of the ball seat 25.

In the ball joint 13 according to the aspect (4) of the present invention, since the cutout sections 26 are provided in the outer peripheral edge portion of the flange section 25e of the ball seat 25, the cutout sections 26 acts to promote a flow of a resin between the inside and the outside of the limiting member 51-3.

According to the ball joint 13 associated with the aspect (4) of the present invention, it is possible to improve the molding quality of the housing 23 around the ball seat 25 in addition to the same effects as in the ball joint 13 according to the aspect (3) of the present invention.

Also, a ball joint 13 according to an aspect (5) of the present invention corresponds to the ball joint 13 according to any one of the aspects (1) to (4) of the present invention, which the limiting member 51 may be formed in a substantially cylindrical shape and the plurality of through holes 53 may open in the circumferential side wall 52 of the limiting member 51.

In the ball joint 13 according to the aspect (5) of the present invention, since the plurality of through holes 53 (the through holes) are provided in the circumferential side wall 52 of the limiting member 51 formed in a substantially cylindrical shape, the plurality of through holes 53 act to promote a flow of a resin between the inside and the outside of the limiting member 51.

According to the ball joint 13 according to the aspect (5) of the present invention, it is possible to improve the molding quality of the housing 23 around the limiting member 51 in addition to the same effects as in the ball joint 13 according to any one of the aspects (1) to (4) of the present invention.

Also, a stabilizer link 11 according to an aspect (6) of the present invention corresponds to the stabilizer link 11 which is provided in the vehicle including the suspension devices 15 and the stabilizer 17, connects the suspension devices 15 to the stabilizer 17, and includes the rod-shaped support bar 11a and the ball joint 13 according to any one of the aspects (1) to (5) of the present invention which is provided at least one end portion in the longitudinal direction of the support bar 11a.

According to the stabilizer link 11 associated with the aspect (6) of the present invention, it is possible to realize the stabilizer link 11 attaining the effects due to the ball joint 13 according to aspects (1) to (5).

A stabilizer with a stabilizer link according to an aspect (7) of the present invention includes the stabilizer 17 and the stabilizer link 11 according to the aspect (6) of the present invention joined to the stabilizer 17.

Other Embodiments

The plurality of embodiments which have been described above illustrate specific examples of the present invention. Therefore, the technical scope of the present invention is not limitedly interpreted by the above-mentioned embodiments. It is possible to realize the present invention in various forms without departing from the gist or main features thereof.

For example, although the ball joint 13 according to the embodiment of the present invention has been described with reference to an example in which the ball joint 13 is applied to the stabilizer link 11 of the vehicle, the present invention is not limited to this example. The ball joint 13 according to the embodiment of the present invention can be widely applied to structures or the like of joint portions of arms included in industrial robots and joint portions of arms included in industrial vehicles such as excavators and cranes.

Also, in the case of a torque management technique using the limiting member 51 according to the embodiment of the present invention, for example, a combination of the torque management technique using the limiting member 51 and high frequency induction heating processing for the housing 23 after the insert injection molding may be applied as other torque management techniques.

Also, in the description associated with the embodiment of the present invention, although aspects in which a torque associated with the sliding of the ball section 21b with respect to the housing 23 is finely adjusted in association with a position in the axial direction (the limiting members 51b and 51c associated with Examples 2 and 3) have been exemplified, the present invention is not limited to this example. An aspect in which a torque associated with the sliding of the ball section 21b with respect to the housing 23 is finely adjusted in association with a position in the circumferential direction may be adopted. Furthermore, a combination of an aspect in which a torque associated with the sliding of the ball section 21b with respect to the housing 23 is finely adjusted in association with a position in the axial direction and an aspect in which a torque associated with the sliding of the ball section 21b with respect to the housing 23 is fir adjusted in association with a position in the circumferential direction may be adopted.

DESCRIPTION OF REFERENCE SIGNS 11 stabiliser link
13 ball joint
15 suspension device (structure)
17 stabilizer (structure)
21 ball stud
21b ball section
21c equatorial section
23 housing
24 hall seat
25 ball seat
25a opening peripheral section of ball seat
25c accommodation section
25e flange section
26 cutout section
51 limiting member
52 circumferential side wall
53 through hole

What is claimed is:

1. A ball joint, comprising:
a metal ball stud which includes a ball section;
a resin housing which rotatably supports the ball section of the ball stud;
a resin ball seat which is provided to be disposed between the housing and the ball section and includes an accommodation section for the ball section; and
a limiting member configured to limit molding shrinkage of the housing and embedded in the housing at an interval with respect to an equatorial section of the ball section such that the limiting member is positioned to surround at least the equatorial section of the ball section, wherein
the limiting member is provided to surround the ball seat,
the ball seat covers more than half an outer surface of the ball section including at least a region from a bottom tip section of the ball section to the equatorial section,
a flange section is formed in a first region including an opening peripheral section of the ball seat and protrudes outward in a radial direction of the ball section further than an outer surface of a second region of the ball seat other than the first region, and
the limiting member is provided to support and abut an outer peripheral surface of the flange section, the outer peripheral surface facing outward in the radial direction.

2. The ball joint according to claim 1, wherein a cutout section is provided in the outer peripheral surface of the flange section of the ball seat.

3. The ball joint according to claim 1, wherein the limiting member is formed in a substantially cylindrical shape, and
   a plurality of through holes are provided in a circumferential side wall of the limiting member.

4. A stabilizer link, comprising:
   a rod-shaped support bar; and
   the ball joint according to claim 1 provided at at least one end in a longitudinal direction of the support bar.

5. A stabilizer assembly, comprising:
   a stabilizer; and
   the stabilizer link according to claim 4 joined to the stabilizer.

6. The ball joint according to claim 1, wherein the limiting member has opposing first and second circumferential ends, wherein a gap is defined between the opposing first and second circumferential ends with respect to a plan view of the limiting member.

7. The ball joint according to claim 1, wherein the limiting member is embedded entirely within the housing.

\* \* \* \* \*